United States Patent [19]

Ochiai et al.

[11] Patent Number: 4,663,276

[45] Date of Patent: May 5, 1987

[54] GLASS BASED LASER RECORDING MATERIAL WITH INTERMEDIATE LAYER

[75] Inventors: Takeji Ochiai; Shinichiro Ohara; Masao Yabe, all of Shizuoka, Japan

[73] Assignee: Fuji Photo Film Co., Ltd., Japan

[21] Appl. No.: 841,033

[22] Filed: Mar. 17, 1986

Related U.S. Application Data

[63] Continuation of Ser. No. 652,537, Sep. 20, 1984, abandoned.

[30] Foreign Application Priority Data

Sep. 20, 1983 [JP] Japan .................................. 58-173676

[51] Int. Cl.[4] ................................................ G03C 1/76
[52] U.S. Cl. .................................... 430/272; 430/495; 430/945; 428/913; 346/135.1
[58] Field of Search ....................... 430/272, 945, 495; 428/913; 346/76 L, 76 R, 135.1

[56] References Cited

U.S. PATENT DOCUMENTS

| 3,971,874 | 7/1976 | Ohta et al. | 428/432 |
| 4,032,691 | 6/1977 | Kido et al. | 428/304 |
| 4,195,312 | 3/1980 | Bell et al. | 346/135.1 |
| 4,405,671 | 9/1983 | Ozawa et al. | 428/65 |

FOREIGN PATENT DOCUMENTS 57-138066  8/1982  Japan .

Primary Examiner—Jack P. Brammer
Attorney, Agent, or Firm—Sughrue, Mion, Zinn, Macpeak & Seas

[57] ABSTRACT

A laser recording material is described, comprising a transparent glass base and a recording layer capable of writing and/or reading information by means of a laser, wherein said glass base has an undercoating layer between the glass base and the recording layer, comprising a carboxyl group-containing polymer or a maleic anhydride copolymer.

18 Claims, No Drawings

GLASS BASED LASER RECORDING MATERIAL WITH INTERMEDIATE LAYER

This is a continuation, of application Ser. No. 652,537, filed 9/20/84.

FIELD OF THE INVENTION

The present invention relates to a thermal recording material for writing and reading information by means of a laser beam and, more particularly, to a laser recording material using a transparent glass plate support.

BACKGROUND OF THE INVENTION

Recording media utilizing beams of high energy density, such as laser beams and the like, are known in the art. In such thermal recording media, the recording layers have high enough optical density to cause a local rise in temperature when they absorb an applied light beam, whereby a chemical or physical change is caused so as to bring about a change in optical characteristics in the locality irradiated with the light beam, thereby resulting in recording of the information.

The recording material of the above-described type have many advantages in that they make it feasible to record a large amount of information in a small area thereof, to write and to read information at a high speed, to have a short access time, to provide records exhibiting excellent keeping quality upon long-range storage, and so on.

In general, recording in such a recording material can be effected by scanning thereon a laser beam which has received amplitude modulation depending on an electric time series signal to which information to be recorded has been converted. In this case, there is the advantage that the recorded image is obtained by real time processing.

Recording layers of the above-described kind (heat mode recording layers) can be obtained by providing on a glass or transparent plastic support a metal of Bi, Sn, In, Te, etc., a semi-metal, a semi-conductor or so on in a thin layer form using an evaporation technique or the like, as described in U.S. Pat. Nos. 4,188,214, 4,291,119, 4,069,487, 4,000,334 and 3,665,483.

In the course of handling and storing these recording materials, it happens that scratches are generated on, or foreign substances like dust adhere to, the recording layer surfaces, which produces adverse effects on the reading of records. For the purpose of obviating this defect, sandwich type (overall adhesion type) or air-sandwich type of information recording materials have been employed (Canadian Pat. No. 1,029,130 and U.S. Pat. No. 4,074,282).

As for the support materials, plastics such as polymethyl methacrylate and the like, though they are superior to other conventional plastics in workability, handling facility, production cost, etc., have problems of liability to scratching and, further, inferiority in dimensional stability and surface properties. Therefore, in view of these problems, glass plate supports are preferable to the plastic ones. However, glass plate supports suffer from the defects that they are inferior in adhesiveness to recording layers, they are easily cracked, they have thermal conductivities greater than plastics by a factor of 10 to lower the sensitivity of a recording layer provided thereon, and their long-range use or storage brings about deterioration of recording characteristics through the migration of ions, such as $K^+$, $Na^+$, $Ca^{2+}$, $Mg^{2+}$, $Ba^{2+}$, $Al^{3+}$, etc., from the glass support into the recording layer. Further, it has been found that the above described problems can be overcome by undercoating the glass base with a specific polymer, and thus the present invention has been attained.

It has been known in Japanese Patent Application (OPI) No. 138066/82 (the term "OPI" as used herein refers to a "published unexamined Japanese patent application") that a conventional polymer is applied to the surface of a base such as glass or metal, etc., by which transmission of heat in the base is prevented by an adiabatic effect of the polymer layer, to thereby increase sensitivity. However, Japanese Patent Application (OPI) No. 138066/82 contains no disclosure showing recognition of the problem of diffusion of metal ions in the base into the recording layer, with resultant reductions in sensitivity or changes in optical density and defects caused by generation of precipitates, nor any solution to overcome such problems.

SUMMARY OF THE INVENTION

A first object of the present invention is to obtain laser recording materials having high stability with the passage of time. Namely, it is to provide laser recording materials in which the recording layer does not deteriorate and precipitates are not formed or the recording layer is not deformed with the passage of time.

A second object of the present invention is to obtain laser recording materials having high sensitivity.

The above-described objects are attained by providing an undercoating layer comprising a carboxyl group-containing polymer or a maleic anhydride copolymer between a glass base and a recording layer of a laser recording material.

DETAILED DESCRIPTION OF THE INVENTION

In the present invention, a disc-form of transparent glass plate support is employed. Examples of glass include silicate glass (e.g., silicate glass, quartz glass, aluminosilicate glass, invert glass, etc.), borate glass, phosphate glass, germanate glass, tellurite glass, vanadate glass and aluminate glass. The thickness of the glass plate support is generally from about 1.0 to 1.5 mm.

The present invention is particularly effective in case that the recording layer contains compounds of metal or semi-metal (hereafter referred to as metal compounds) such as sulfides, oxides, halides, borides, silicides, carbonates or nitrides, etc., as compared with the case that metal or semi-metal is used as a simple substance or alloy in the recording layer. As this reason, it is believed that the recording layer containing these metal compounds has high sensitivity in case of writing with laser light, but it is easily subject to influence of metal ions in the glass base.

Examples of the metal compounds used in the recording layer of the present invention include metal sulfides such as $Ga_2S_3$, $CrS$, $Cr_2S$, $Cr_2S_3$, $MoS_2$, $MnS$, $FeS$, $FeS_2$, $CoS$, $Co_2S_3$, $NiS$, $Ni_2S$, $PdS$, $Cu_2S$, $Ag_2S$, $ZnS$, $In_2S_3$, $In_2S_2$, $CeS_x$ (x is a positive real number), $SnS$, $SnS_2$, $PbS$, $GeS_x$ (x is a positive real number), $As_2S_3$, $Sb_2S_3$, $Bi_2S_3$, etc.; metal oxides such as $InO$, $In_2O$, $In_2O_3$, $GeO$, $PbO$, $Sm_2O_3$, $Eu_2O_3$, $Al_2O_3$, $Ga_2O_3$, $Y_2O_3$, $V_2O_3$, $VO_2$, $TiO$, $Nb_2O_5$, $HfO_2$, $MoO$, $MoO_2$, $MoO_3$, $WO_2$, $WO_3$, $La_2O_3$, $Yb_2O_3$, $SiO$, $Nd_2O_3$, $CeO_2$, $MnO$, $NiO$, $GeO_2$, $ZnO$, $ZrO_2$, $SnO_2$, $SiO_2$, etc.; metal iodides such as $ZnI_2$, $SbI_3$, $SbI_5$, $CdI_2$, $KI$, $AgI$, $ZrI_4$, $SnI_2$, $SnI_4$, $SrI_2$, $CsI$, $TlI$, $WI_2$, $TiI_4$, $CuI$, $ThI_4$, $PbI_2$, $BiI_3$, etc.; metal bromides such as $SbBr_3$, $AgBr$, $SnBr_2$, $CsBr$, $TlBr$, $CuBr$, $NaBr$, $PbBr_2$, $NbBr$, $BaBr_2$, etc.; metal chlorides such as $CdCl_2$, $KCl$, $AgCl$, $SnCl_2$, $TlCl$, $TaCl_5$, $CuCl$, $NaCl$, $PbCl_2$, $NdCl_3$, $BaCl_2$, etc.; metal fluorides such as $MgF_2$, $CaF_2$, $RhF_2$, $ZnF_2$, $AlF_3$, $CrF_2$, $ZrF_4$, $SnF_2$, $TlF$, $FeF_2$, $FeF_3$, $CuF$, $NaF$, $PbF_2$, $NbF_2$, $NiF_2$, $BaF_2$, $BiF_2$, $MnF_2$, $LiF$, etc.; metal borides such as $TiB_2$, $ZrB_2$, $CaB_6$, $SrB_6$, $NbB_2$, $MoB_2$, $TaB_2$, etc.; metal silicides such as $V_3Si$, $FeSi_2$, $B_6Si$, etc.; metal carbides such as $SiC$, $VC$, $ZrC$, $B_4C$, $HfC$, etc.; and metal nitrides such as $TiN$, $TaN$, $Si_3N_4$, etc. Of these, $GeS$, $SnS$, $TiB_2$, $ZrB_2$, $VC$, $Si_3N_4$, $B_6Si$, $Ga_2S_3$ and $MoO_3$ are preferably used.

It is further advantageous from the viewpoints of sensitivity, optical density, and stability to the passage of time that these metal compounds are used as a mixture by vacuum evaporation together with metal or semi-metal, such as In, Sn, Ge, Te, Al, Bi, Zn, Cu, etc. In the case, the metal compound is preferably contained in an amount of 15 to 90 wt %, more preferably 30 to 60 wt % and most preferably 35 to 55 wt %, based on the weight of the recording layer.

Undercoating with the specific polymer in the present invention is effective not only for preventing adverse effects on the recording layer by metal ions in the glass plate, but also for increasing the S/N (signal/noise) ratio by sharpening the outline of pits in the case of recording materials in which recording is carried out by melting the recording layer with heat to form pits.

The carboxyl group-containing polymer used in the undercoating layer is polymer of a monomer having a carboxyl group and an unsaturated double bond or copolymer thereof, or a copolymer of the above-described monomers and other unsaturated compounds, for example, styrene, vinyl acetate, vinyl ether and methyl methacrylate, etc., which may also be used as the comonomer for the maleic anhydride copolymer used in the undercoating layer. The carboxyl group-containing polymer preferably contains at least 2 mol %, more preferably 3 to 100 mol %, most preferably 5 to 70 mol %, of monomer unit containing a carboxyl group. The maleic anhydride copolymer preferably contains 30 to 60 mol %, more preferably 40 to 55 mol %, of maleic anhydride as the monomer unit.

Examples of the carboxyl group-containing polymer used in the present invention include homopolymers and copolymers of acrylic acid, α-methylacrylic acid, ethylacrylic acid, 2-methoxyacrylic acid, 2-butoxyacrylic acid, 2-phenoxyacrylic acid, chloroacrylic acid, hydroxyacrylic acid, cyanoacrylic acid, dimethylaminoacrylic acid, 2,2-dimethylhydroxyacrylic acid, itaconic acid, crotonic acid, sorbic acid, cinnamic acid, fumaric acid, maleic acid, citraconic acid, mesaconic acid and the like. Examples of the maleic anhydride copolymer include styrene-maleic anhydride copolymer, vinyl ether-maleic anhydride copolymer, vinyl acetate-maleic anhydride copolymer, methyl methacrylate-maleic anhydride copolymer and the like. Of these, polyacrylic acid, polymethacrylic acid, styrene-maleic anhydride copolymer and styrene-maleic acid copolymer are preferred. The most suitable polymer is styrene-maleic anhydride copolymer, which has an effect of preventing formation of creases on the recording layer in the case of exposing the recording material under a high temperature and a high humidity in addition to the above-described effect.

The above-described polymers (including copolymers) are preferred to have an average molecular weight of from 5,000 to 500,000, and more preferably from 10,000 to 200,000. Polymers having a molecular weight of less than 5,000 have a lesser ability of preventing diffusion of metal ions. If the molecular weight is beyond 500,000, the coated face tends to become uneven.

The polymers described in Japanese Patent Application (OPI) No. 138066/82 generally do not have the effects of the present invention, such as preventing deterioration of the recording layer with passage of time, preventing the lowering of adhesive strength between the recording layer and the base with the passage of time, and preventing formation of precipitates between the recording layer and the base. Thus, the objects, functions, and effects of the present invention are quite different from those described in Japanese Patent Application (OPI) No. 138066/82. For example, polyvinyl chloride, vinyl acetate-vinyl chloride copolymer, polyethylene and polystyrene, etc., do not have the above-described effect.

The carboxyl group-containing polymer and the maleic anhydride copolymer can be used alone or in combination. The undercoating layer of the present invention may further contain other polymers, such as epoxy resins, nitrocellulose, phenol resins, polymethyl methacrylate, ethylene-vinyl acetate copolymer and polystyrene as long as the effects of the present invention are not lost.

The undercoating layer of the present invention preferably contains the specific polymers in an amount of at least 40 wt % and more preferably 60 wt % or more based on the total weight of undercoating layer. The undercoating layer preferably has a dry thickness of from 0.01 to 20μ, and more preferably from 0.1 to 3μ.

In order to further increase the sensitivity, a polymer having no carboxyl group may be applied as a second undercoating layer to the specific polymer layer in the present invention, and a recording layer may be provided on the second undercoating layer. The second undercoating layer preferably has a dry thickness of 0.01 to 50μ, more preferably 0.05 to 10μ and most preferably 0.1 to 3μ.

Examples of polymers having no carboxyl group that may be used for the second undercoating layer include acryl resins, cellulose type polymers, vinyl polymers, chlorinated polymers, etc. Examples thereof include polymethyl methacrylate, cellulose acetate, nitrocellulose, polystyrene, polyvinyltoluene, polyhydroxystyrene, methyl acrylate-vinyl alcohol copolymer and chlorinated polyolefin, etc.

The solvent for dissolving the polymers used in the present invention may be selected from acetone, methyl ethyl ketone, methyl isobutyl ketone, diacetone alcohol, methyl cellosolve, ethyl cellosolve, butyl cellosolve, methyl cellosolve acetate, ethyl cellosolve acetate, butyl cellosolve acetate, methanol, ethanol, propanol, isopropyl alcohol, butanol and dimethylformamide, etc., according to the high polymer used.

Various known kinds of additives such as plasticizers, lubricants, surface active agents (e.g., fluorine type surface active agents), silane coupling agents, etc., can be added to the first or second undercoating layer according to the intended purpose.

Useful coating processes include spray coating, spin coating, dip coating, roll coating, blade coating, doctor roll coating, and screen printing process, etc.

In the following, the present invention is illustrated by examples, but the present invention is not limited thereto.

EXAMPLE 1

A soda lime glass plate (2.5 inches square, thickness: 1.5 mm, diameter: 300 mm) was washed with alkali and isopropyl alcohol, and dried. To this glass plate, a 3% methanol solution of polyacrylic acid (molecular weight: about 100,000) was applied as a carboxyl group-containing polymer by means of a spin coater at 3,000 rpm for 30 seconds, and dried at 100° C. for 10 minutes. The thickness of the undercoating layer was $0.2\mu$.

On this base plate, a recording layer was formed by vacuum coevaporation of In and GeS in amounts of 250 Å and 200 Å, respectively, calculated as individual layer thicknesses. Sensitivity, recording preservation stability, and the adhesive strength of this sample were evaluated after the passage of time.

EXAMPLE 2

To an undercoating layer of $0.2\mu$ prepared by applying polyacrylic acid by the same manner as in Example 1, a 2% solution of polymethyl methacrylate in a mixture of methyl ethyl ketone/methyl cellosolve acetate (6/4) was applied so as to have a dried thickness of $0.2\mu$ to form a second undercoating layer. Thereafter, a recording layer was formed in the same manner as in Example 1 to obtain a sample.

EXAMPLE 3

A sample having a first undercoating layer ($0.2\mu$ thick) of poly($\alpha$-methylacrylic acid) and a second undercoating layer ($0.2\mu$ thick) of polymethyl methacrylate was obtained by the same procedure as in Example 2, except that poly($\alpha$-methylacrylic acid) (molecular weight: about 70,000) was used instead of polyacrylic acid. Thereafter, a recording layer was produced in the same manner as in Example 1.

EXAMPLE 4

Instead of a solution of poly($\alpha$-methylacrylic acid) in Example 2, a solution of 2 g of styrene-maleic anhydride copolymer (styrene content: 52%, maleic anhydride content: 48%, molecular weight: about 40,000), 50 ml of methyl ethyl ketone and 50 ml of methyl cellosolve acetate was applied by a spin coater at 1,000 rpm for 30 seconds to form the first undercoating layer having a dry thickness of $0.2\mu$. Thereafter, the same processing as in Example 2 was carried out.

EXAMPLE 5

The same processing as in Example 2 was carried out, except that a solution of styrene-maleic acid copolymer (styrene content: 52%, maleic acid content: 48%, molecular weight: about 40,000) was used instead of the solution of polyacrylic acid.

EXAMPLE 6

The same processing as in Example 4 was carried out, except that nitrocellulose (trademark: Daicel RS1/2; having a degree of nitration represented by the nitrogen content of 11.5 to 12.2%, and a solution viscosity according to JIS K6703 of 9 to 14.9 seconds at 25%) was applied so as to have a thickness of $0.2\mu$, instead of the polymethyl methacrylate of the second undercoating layer as in Example 4.

COMPARATIVE EXAMPLE 1

A sample was produced and evaluated in the same manner as in Example 1, except that a 3% solution of polyvinylidene chloride in methyl ethyl ketone was applied so as to have a dry thickness of $0.4\mu$, instead of using a solution of polyacrylic acid as in Example 1.

COMPARATIVE EXAMPLE 2

A sample was produced and evaluated in the same manner as in Example 1, except that a 3% solution of vinyl acetate-vinyl chloride copolymer (polymerization ratio: 20/80; degree of polymerization: 2,000) in methyl ethyl ketone was applied so as to have a dry thickness of $0.4\mu$, instead of using a solution of polyacrylic acid as in Example 1.

COMPARATIVE EXAMPLE 3

A sample was produced and evaluated in the same manner as in Example 1, except that a 3% solution of polystyrene (molecular weight: about 40,000) in methyl ethyl ketone was applied so as to have a dry thickness of $0.4\mu$, instead of using a solution of polyacrylic acid as in Example 1.

COMPARATIVE EXAMPLE 4

A sample was produced and evaluated in the same manner as in Example 1, except that a solution composed of 2 g of polymethyl methacrylate (molecular weight: about 40,000), 90 ml of toluene and 10 ml of methyl cellosolve was applied so as to have a dry thickness of $0.4\mu$, instead of using a solution of polyacrylic acid in Example 1.

Measurement of laser recording sensitivity was carried out as follows. Namely, a disc sample was revolved at 515 rpm, and laser light having a wavelength of 820 nm focused so as to have a diameter of $1.3\mu$ by a lens was applied to the recording layer of the position at a distance of 90 mm from the center of the disc. The lowest laser output (mW) capable of recording was evaluated as recording sensitivity; i.e., a lower value means a higher sensitivity. The results obtained are shown in Table 1.

Evaluation of stability with the passage of time was carried out in a manner that each sample was allowed to stand at 50° C. and 80% RH, and formation of precipitates after 5 days and 30 days was observed by an optical microscope with a magnification of ×200. The results obtained are shown in Table 1.

TABLE 1

| Sample | Undercoating Layer | | Sensitivity (mW) | Precipitate |
| --- | --- | --- | --- | --- |
| Example 1 | Polyacrylic acid | $0.2\mu$ | 14 | No formation after 30 days |
| Example 2 | Polyacrylic acid + Polymethyl methacrylate | $0.2\mu$ $0.2\mu$ | 8 | No formation after 30 days |
| Example 3 | Poly($\alpha$-methylacrylic acid) + Polymethyl methacrylate | $0.2\mu$ $0.2\mu$ | 8 | No formation after 30 days |
| Example 4 | Styrene-maleic anhydride copolymer + Polymethyl methacrylate | $0.2\mu$ $0.2\mu$ | 8 | No formation after 30 days |
| Example 5 | Styrene-maleic acid copolymer + Polymethyl | $0.2\mu$ $0.2\mu$ | 8 | No formation after 30 days |

TABLE 1-continued

| Sample | Undercoating Layer | | Sensitivity (mW) | Precipitate |
|---|---|---|---|---|
| | methacrylate | | | |
| Example 6 | Styrene-maleic anhydride copolymer + | 0.2μ | 8 | No formation after 30 days |
| | Nitrocellulose | 0.2μ | | |
| Comparative Example 1 | Polyvinylidene chloride | 0.4μ | 10 | Formation after 5 days |
| Comparative Example 2 | Vinyl acetate-vinyl chloride copolymer | 0.4μ | 12 | Formation after 30 days |
| Comparative Example 3 | Polystyrene | 0.4μ | 9 | Formation after 30 days |
| Comparative Example 4 | Polymethyl methacrylate | 0.4μ | 8 | Formation after 30 days |

It is understood from Table 1 that, in laser recording materials of the present invention, recording can be carried out at a laser power of 14 mW or less and precipitates are not formed with the passage of time. Further, in samples wherein the second layer of a polymer having no carboxyl group is provided on the undercoating layer of a carboxyl group-containing polymer or maleic anhydride copolymer, as shown in Examples 2 to 6, recording can be carried out at a laser power of 8 mW or less, sensitivity is very high, and formation of precipitates is not observed.

While the invention has been described in detail and with reference to specific embodiments thereof, it will be apparent to one skilled in the art that various changes and modifications can be made therein without departing from the spirit and scope thereof.

What is claimed is:

1. A laser recording material comprising a transparent glass base and a recording layer capable of writing and/or reading information by means of a laser, wherein said glass base has an undercoating layer between the glass base and the recording layer, said undercoating layer comprising a carboxyl group-containing polymer or a maleic anhydride co-polymer such that said undercoating layer substantially prevents diffusion of metal ions from said glass base to said recording layer, and said recording layer containing a metal, a metal compound or a semi-metal compound.

2. A laser recording material according to claim 1, wherein said undercoating layer has a thickness of from 0.01 to 20μ.

3. A laser recording material according to claim 1, wherein said undercoating layer has a thickness of from 0.1 to 3μ.

4. A laser recording material according to claim 1, wherein said undercoating layer comprises a polymer or copolymer which contains acrylic acid, α-methylacrylic acid, itaconic acid, crotonic acid, sorbic acid, fumaric acid, maleic acid, or maleic anhydride as a monomer unit.

5. A laser recording material according to claim 1, wherein said undercoating layer comprises polyacrylic acid, polymethacrylic acid, styrene-maleic anhydride copolymer, or styrene-maleic acid copolymer.

6. A laser recording material according to claim 1, wherein said recording layer contains a metal compound or a semi-metal compound selected from sulfides, oxides, halides, borides, silicides, carbides, and nitrides of a metal or semi-metal.

7. A laser recording material according to claim 1, wherein the polymer or copolymer has an average molecular weight of from 5,000 to 500,000.

8. A laser recording material according to claim 1, wherein the polymer or copolymer has an average molecular weight of from 10,000 to 200,000.

9. A laser recording material according to claim 1, wherein said undercoating layer has a thickness of from 0.01 to 20μ and comprises a polymer or a copolymer having a molecular weight of from 5,000 to 500,000 selected from the group consisting of polyacrylic acid, polymethacrylic acid, styrene-maleic anhydride copolymer, and styrene-maleic acid copolymer.

10. A laser recording material according to claim 1, wherein said undercoating layer has a thickness of from 0.1 to 3μ and comprises a polymer or a copolymer having a molecular weight of from 10,000 to 200,000 selected from the group consisting of polyacrylic acid, polymethacrylic acid, styrene-maleic anhydride copolymer, and styrene-maleic acid copolymer.

11. A laser recording material according to claim 1, wherein a layer of a polymer having no carboxyl group is provided on the undercoating layer comprising the carboxyl group-containing polymer or maleic anhydride copolymer.

12. A laser recording material according to claim 11, wherein said undercoating layer has a thickness of from 0.01 to 20μ.

13. A laser recording material according to claim 11, wherein said undercoating layer has a thickness of from 0.1 to 3μ.

14. A laser recording material according to claim 11, wherein said undercoating layer comprises a polymer or copolymer which contains acrylic acid, α-methylacrylic acid, itaconic acid, crotonic acid, sorbic acid, fumaric acid, maleic acid, or maleic anhydride as a monomer unit.

15. A laser recording material according to claim 11, wherein said undercoating layer comprises polyacrylic acid, polymethacrylic acid, styrene-maleic anhydride copolymer, or styrene-maleic acid copolymer.

16. A laser recording material according to claim 11, wherein said recording layer contains a metal compound or a semi-metal compound selected from sulfides, oxides, halides, borides, silicides, carbides, and nitrides of a metal or semi-metal.

17. A laser recording material according to claim 11, wherein said layer comprises polymethyl methacrylate.

18. A laser recording material according to claim 11, wherein said layer comprises nitrocellulose.

* * * * *